United States Patent
Bosch et al.

(10) Patent No.: US 9,658,113 B2
(45) Date of Patent: May 23, 2017

(54) RESETTING AND HILBERT FILTERING OF SELF-MIXING INTERFEROMETRIC SIGNAL

(71) Applicants: INSTITUT NATIONAL POLYTECHNIQUE DE TOULOUSE, Toulouse (FR); CENTRE NATIONAL DE LA RECHERCHE SCIENTIFIQUE, Paris (FR)

(72) Inventors: Thierry Bosch, Toulouse (FR); Francis Bony, Lavalette (FR); Antonio Luna Arriaga, Toulouse (FR)

(73) Assignees: INSTITUT NATIONAL POLYTECHNIQUE DE TOULOUSE, Toulouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/903,607

(22) PCT Filed: Jul. 4, 2014

(86) PCT No.: PCT/EP2014/064349
§ 371 (c)(1),
(2) Date: Jan. 8, 2016

(87) PCT Pub. No.: WO2015/004026
PCT Pub. Date: Jan. 15, 2015

(65) Prior Publication Data
US 2016/0153838 A1  Jun. 2, 2016

(30) Foreign Application Priority Data
Jul. 8, 2013  (FR) ...................... 13 56675

(51) Int. Cl.
*G01B 9/02* (2006.01)
*G01J 9/02* (2006.01)

(52) U.S. Cl.
CPC ............ *G01J 9/02* (2013.01); *G01B 9/02083* (2013.01); *G01B 9/02092* (2013.01)

(58) Field of Classification Search
CPC .... G01J 9/02; G01B 9/02092; G01B 9/02083
See application file for complete search history.

(56) References Cited

U.S. PATENT DOCUMENTS

2013/0033696 A1\* 2/2013 Ueno .................... G01S 17/325
356/28.5

OTHER PUBLICATIONS

International Search Report, dated Aug. 19, 2014, from corresponding PCT application.

(Continued)

*Primary Examiner* — Hwa Lee
(74) *Attorney, Agent, or Firm* — Young & Thompson

(57) ABSTRACT

An optical device (10) for determining a physical parameter includes: a laser diode (11) for emitting a beam toward a target; an element for detecting (13) an interferometric signal SM(t) which includes the information on the physical parameter to be determined, and which is generated by an interference between the emitted beam and a light beam reflected by the target; element for converting (15) the signal SM(t) obtained by the detection element (13) into a measurement of the physical parameter, the conversion element (15) including: first element (17) for suppressing a continuous component Off(t) of the interferometric signal SM(t); second element (18) for determining interferometric peaks in the interferometric signal SM(t) obtained from the signal obtained at the output of the first element (17). An associated method, particularly suitable for speckle interferometric signals is also described.

7 Claims, 5 Drawing Sheets

(56) References Cited

OTHER PUBLICATIONS

M. Norgia et al., "High resolution self-mixing laser rangefinder", Review of Scientific Instruments, Apr. 1, 2012, pp. 45113-1 to 45113-6, vol. 83, No. 4.

Lu Wei et al., "Phase Unwrapping of Self-mixing Signals Observed in Optical Feedback Interferometry for Displacement Measurement", Intelligent Signal Processing and Communications, Dec. 1, 2006, pp. 780-783.

D.A. Zweig et al., "A Hilbert Transform Algorithm for Fringe-Pattern Analysis", Nov. 1, 1990, retrieved from the Internet: http://proceedings.spiedigitallibrary.org/data/Conferences/SPIEP/43335/295_1.pdf.

Kenju Otsuka et al., "Real-time nanometer-vibration measurement with a self-mixing microchip solid-state laser", Optics Letters, Aug. 1, 2002, pp. 1339-1341, vol. 37, No. 15.

Usman Zabit et al., "Self-Mixing Laser Sensor for Large Displacements: Signal Recovery in the Presence of Speckle", IEEE Sensors Journal, Feb. 1, 2013, pp. 824-831, vol. 13, No. 2.

\* cited by examiner

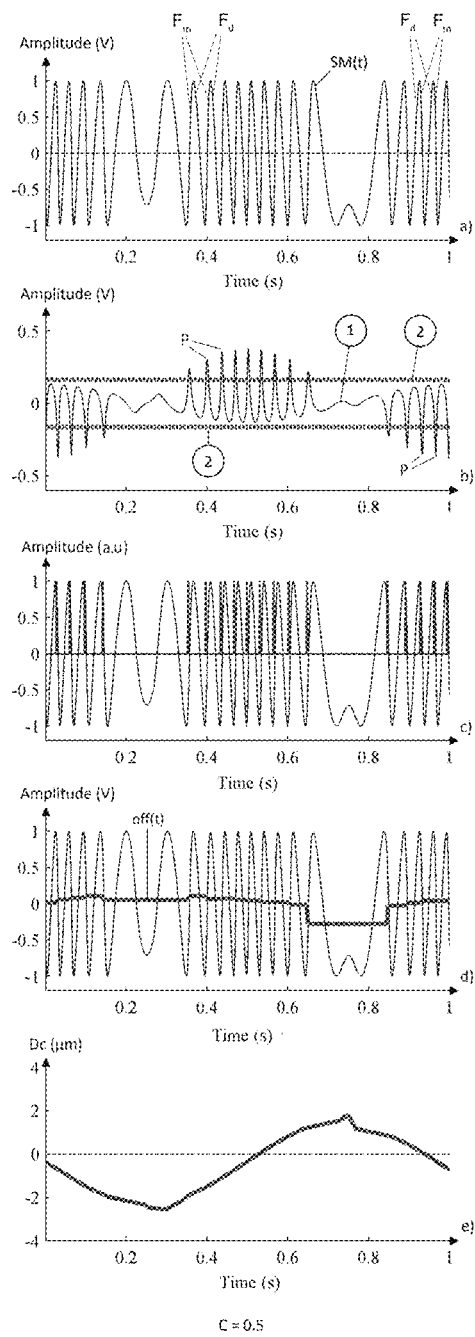
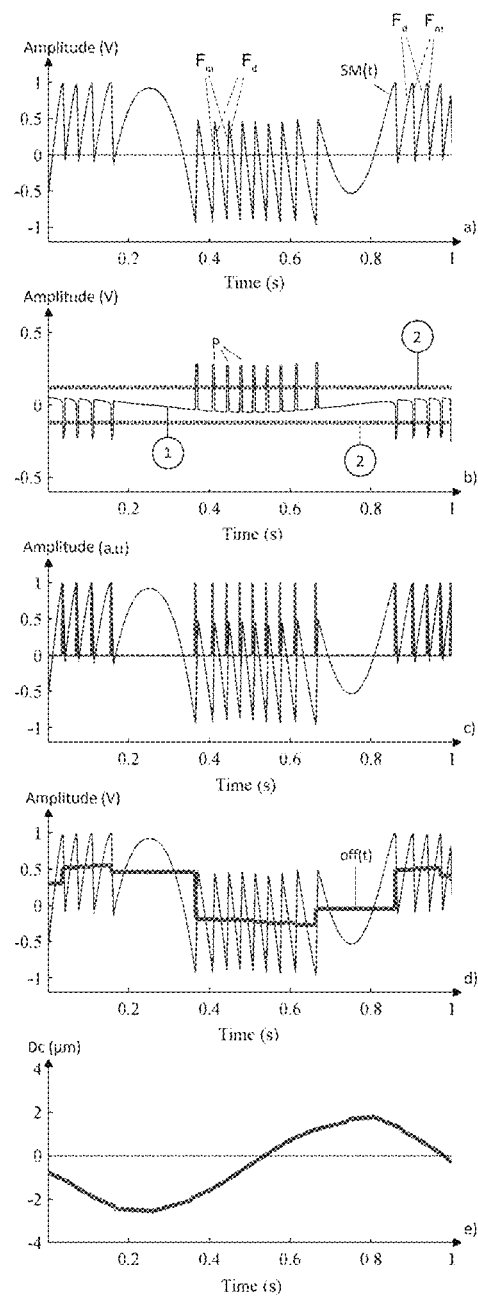
Fig. 3                    Fig. 4

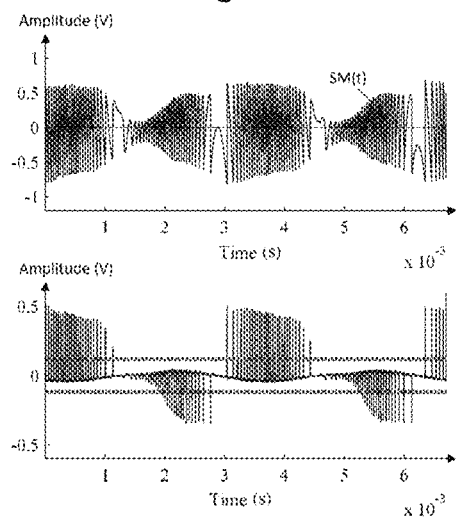
Fig. 8a
Fig. 8b
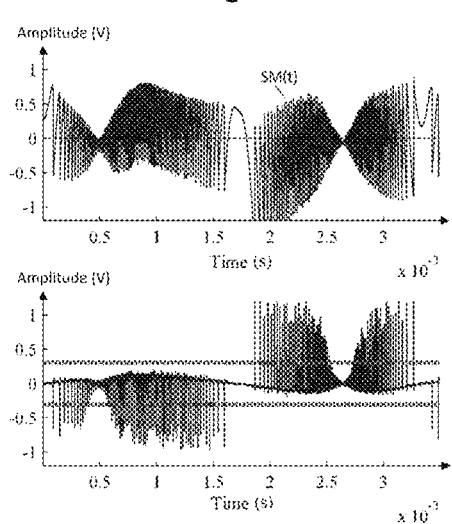
Fig. 9a
Fig. 9b
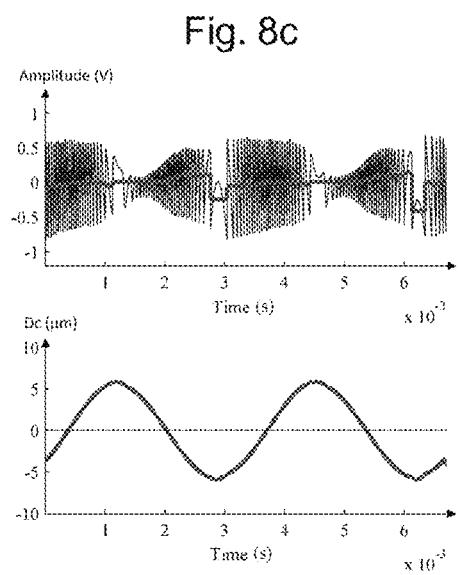
Fig. 8c
Fig. 8d
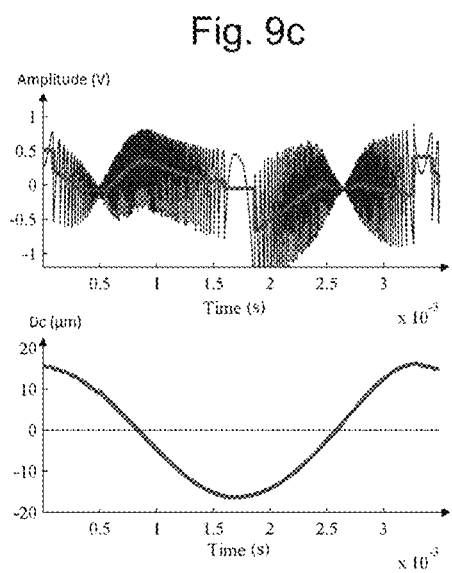
Fig. 9c
Fig. 9d

RESETTING AND HILBERT FILTERING OF SELF-MIXING INTERFEROMETRIC SIGNAL

FIELD OF THE INVENTION

The present invention relates to the field of optoelectronic measuring devices. More particularly, the invention relates to an optical device for determining a physical parameter associated with a target and to an associated processing method, whatever the surface finish of the target and its distance, in real-time. The invention is mainly based on self-mixing and is advantageously used to measure the movement of a target.

PRIOR ART

There are many types of devices for measuring movement, vibration, distance, etc. of a target, allowing what are called nondestructive measurements to be carried out, i.e. measurements that do not deteriorate the target on which they are performed.

Optical methods are often used because they have the advantage of not requiring contact with the target and are unintrusive. They are based on the transmission of a light beam by a laser light source to a target and on the measurement of changes in the optical properties of the light beam returned from the target by suitable detecting and measuring means.

Among existing optical devices, mention may be made, by way of example, of Michelson interferometers, optical fiber interferometers and triangulation sensors. However, for these types of devices, the use of many optical components is necessary, thereby making it difficult to produce compact sensors that are easy to use and inexpensive. Certain of these devices in addition have a measuring range limited to a few centimeters or even a few millimeters.

In comparison, devices based on the optical feedback effect generally known as self-mixing are compact, flexible and inexpensive.

These devices are simple to produce and require only one laser light source emitting a measuring light beam onto the target the movement of which is for example to be measured. Some of the measuring beam is reflected by the target and reinjected into an active cavity of the laser source, producing interference in the active cavity of the laser source.

When an optical path traced by the measuring beam issued from the laser light source and encountering the target varies, for example as a function of the movement of the target, fluctuations, especially in emitted optical power, occur, these fluctuations being caused by the interference. These fluctuations are detected either by a photodetector, such as for example a photodiode located on a back side of the laser light source, or directly via a junction voltage of the laser light source. The signals obtained from the photodiode or from the junction voltage of the laser light source are processed by suitable processing means and information relating to the movement of the target or to the variation in the refractive index of the medium is deduced therefrom. Thus, the laser light source plays both the role of a light source and the role of a micro-interferometer, without requiring external optical components. However, when the target is placed more than a few centimeters away, a focusing lens may be inserted between the laser light source and the target.

The main difference with conventional interference resides in the fact that so-called "self-mixing" interference occurs in an active medium (a gas-filled or semiconductor cavity) whereas conventional interference is generally observed in free space or a dielectric, i.e. in a passive medium. As a result of this notable difference, and in contrast to the case of conventional interference, in the case of "self-mixing" the intensity modulation generated by the interference does not have a sinusoidal shape.

Typical interferometric signals generated by the self-mixing effect are interferometric fringes having a specific, more or less pronounced asymmetric sawtooth shape.

Measuring devices based on self-mixing thus have the advantage of being self-aligned, compact and less expensive than devices based on conventional interferometry.

Existing measuring devices have the drawback of being sensitive to the level of optical feedback to the laser light source. This level of optical feedback, defined by the adimensional parameter C, is a function of the distance of the laser light source to the target and of the surface finish of the latter. A target having a rough surface finish engenders random and abrupt variations in the level of optical feedback C to the active cavity of the laser light source, thereby modifying and degrading the waveform of the interferometric signal to be processed.

The form of the interferometric fringes of the interferometric signal has, on the one hand, an asymmetric sawtooth shape that becomes increasingly marked as the strength of the optical feedback to the laser light source increases, and on the other hand, exhibits a hysteresis when the value of the level of optical feedback C is high, at least 4.5 or thereabouts.

In addition, when the target has a rough surface finish, the interferometric signal is randomly degraded by incoherent superposition of reflected beams. This effect, known as speckle, leads to strong modulation of the envelope of the interferometric signal, and possibly even to said interference signal being lost, and therefore to a loss of information on the movement of the target, and also adversely affects the processing of the interferometric signal.

By way of examples of self-mixing measuring devices suitable for use with rough targets, mention may be made of:

Norgia et al. ("Interferometric measurements of displacement on a diffusing target by a speckle tracking technique", IEEE Journal of Quantum Electronics, Vol. 37, No. 6, June 2001);

Guiliani et al. ("Self-mixing laser diode vibrometer", Meas. Sci. Technol. 14 (2003) 24-32); and Magnani et al. ("Self-mixing vibrometer with real-time digital signal elaboration", Applied Optics, Vol. 51, No. 21, Jul. 20, 2012).

In the scientific publication by Norgia et al., the self-mixing measuring device includes piezoelectric components, in order to use a speckle tracking technique. This consists in varying the transverse position of the spot of the beam on the target, as a function of the relative maximum amplitude of the received signal.

This measuring device employs external components that are incompatible with device simplicity and the bulk of which may be incompatible with many applications, especially in the field of on-board systems.

In the scientific publication by Guiliani et al. the self-mixing measuring device employs an electronic feedback loop to control the laser diode in order to stabilize the received interferometric signal. The device uses a triangular modulation current on the emitted beam in order to distinguish the direction of the fringes. The principle consists in locating the center of the interferometric fringes by its electronic voltage in order to make it possible to guarantee its detection by a comparison of voltages.

However, the performance of this measuring device is satisfactory only for the type of interferometric signals having a sawtooth waveform with a hysteresis effect, signals typical of highly reflective surfaces and only for target vibrations of small amplitude, at most 180 μm.

In addition, it employs external components, two lenses spaced apart by 40 cm, this being incompatible with the notion of bulk and fragility of the measuring device.

In the scientific publication by Magnani et al., the self-mixing measuring device varies the diameter of the spot of the beam via an autofocus mechanism in the lens, similar to commercially available digital cameras, thereby requiring a few seconds to adapt when the waveform of the signal is modified (frequently the case with rough targets).

In addition, the device is limited to the measurement of signals of substantially constant amplitude, at the risk of having to restart the autofocus mechanism when the automatically preset threshold is no longer valid.

The three exemplary measuring devices described above must meet a very precise set of specifications (measurement ranges, type of service, bulk, etc.), employ exterior components and cannot easily adapt to changes in operating conditions.

SUMMARY OF THE INVENTION

The aim of the invention is therefore to provide a device for measuring and a method for processing an interferometric signal in real-time and suitable for any type of target and target distance.

Another aim of the invention is to provide a measuring device based on the self-mixing effect meeting size, performance and cost constraints making its use in an industrial setting realistic.

For this purpose, the present invention relates, according to a first aspect, to an optical device for determining a physical parameter. The device includes:
 a laser light source configured to generate a light beam, called the emitted beam, in the direction of a target;
 a means for detecting an interferometric signal SM(t), said interferometric signal including information on the physical parameter to be determined, and being generated by interference between the emitted beam and a light beam reflected by the target, in an optical cavity of the laser light source; and
 means for converting the interferometric signal SM(t) obtained by the detecting means into a measurement of the physical parameter.
The converting means advantageously include:
 first means for removing a continuous component Off(t) from the interferometric signal SM(t); and
 second means for determining interferometric peaks of the interferometric signal SM(t), said peaks being obtained from the signal obtained as output from the first means.

The physical parameter that it is possible to measure is especially a movement of the target, its speed or its distance to the laser light source.

The interferometric signal SM(t) obtained is a signal typical of self-mixing and differs from so-called conventional interferometric signals in that it contains non-sinusoidal interferometric fringes having a specific, more or less pronounced asymmetric sawtooth shape. Such interferometric fringes each have a rising front and a descending front. A rising front of an interference fringe is defined as the front having the highest degree of inclination relative to the abscissa, i.e. the steepest.

The degree of inclination of the saw teeth increases with the level of optical feedback to the laser light source.

The expression "continuous component" is understood to mean the average value of the interferometric signal.

The expression "removing a continuous component" is understood to mean resetting the interferometric signal SM(t) in order to center it about zero.

The expression "interferometric peak" is understood to mean the rising front of an interference fringe.

Such an optical device advantageously allows a physical parameter to be determined without constraint on the waveform of the interferometric signal, i.e. without constraint on the surface finish of the (cooperative or uncooperative) target, and without constraint on the level of optical feedback.

According to preferred embodiments, the invention furthermore has the following features, which may be implemented separately or in each of their technically possible combinations.

In particular embodiments, the second means for determining the interferometric peaks of the interferometric signal include a Hilbert filter. The first means are configured to remove the continuous component locally for each of the interference fringes of the interferometric signal.

In other words, the removal of the continuous component is not a blanket removal (removal of the average value from all of the interference fringes), as produced in a median filter or a mean filter. For each interference fringe, the associated continuous component referred to as the local component is removed. The local continuous components are removed one by one, independently of one another. The removal of these local continuous components is carried out for all the interferometric fringes.

In particular embodiments, the optical device does not include means for calibrating the laser light source and/or means for calibrating the level of optical feedback C of the target.

In particular embodiments, the optical device does not include exterior components. Optionally, the device includes a focal lens when the target is placed more than a few centimeters away.

Such a device has a non-negligible advantage in terms of bulk and installation, and therefore in terms of ease of implementation, making its use in an industrial setting realistic.

The invention also relates to a method for processing an interferometric signal SM(t) obtained by self-mixing, the signal being characterized by interference fringes of asymmetric sawtooth shape. The method includes, in succession, the steps of:
 removing a continuous component from the interferometric signal SM(t), in order to obtain a corrected signal $SM_c(t)$; then
 determining interferometric peaks of said interferometric signal SM(t) from the corrected signal $SM_c(t)$.

The step of removing a continuous component advantageously allows subsequent processing of the interferometric signal SM(t) to be made easier.

Such a processing method is advantageously insensitive to the effect of random degradation of the interference signal, due to any sort of perturbation, and therefore allows any type of interferometric signal obtained by self-mixing to be processed.

Such a method also achieves a higher degree of effectiveness in the processing of interferometric signals, as it may be carried out in real-time.

According to preferred modes of implementation, the invention furthermore has the following features, implemented separately or in each of their technically possible combinations.

In particular modes of implementation, the continuous component Off(t) of the interferometric signal SM(t) is removed locally, for each interference fringe of the interferometric signal SM(t).

The continuous component Off(t) is composed of a set of segments placed end-to-end.

The continuous component Off(t) consists of a set of continuous components that are said to be "local". Each local continuous component is defined relative to one interference fringe of the interferometric signal SM(t). A local continuous component is measured for each detected interference fringe of the interferometric signal SM(t).

In particular modes of implementation, the interferometric peaks are determined by calculating a phase of the corrected signal $SM_c(t)$.

In preferred modes of implementation, the interferometric peaks are determined by applying a Hilbert filter to the corrected signal $SM_c(t)$.

The removal of the continuous component associated with the use of the Hilbert filter thus allows effects that randomly degrade the interferometric signal, which effects include the hysteresis effect or the fading effect associated with speckle, to be eliminated.

Thus, such a processing method is particularly advantageous when it is associated with a device such as described above in at least one of its embodiments, for the measurement of rough targets.

The elimination of hysteresis and fading effects from the interferometric signal SM(t) advantageously makes it possible to use only one signal processing algorithm, whatever the distance or the surface finish of a target a physical parameter of which it is being sought to measure.

Processing of the interferometric signal is greatly simplified because it is automatic, and achieved by simple filtering. Furthermore, contrary to other existing methods, it is not necessary to work over one period of the interferometric signal to obtain the required information, two interferometric fringes alone being sufficient. It is therefore no longer necessary to store points before initiating the signal processing. The number of points to be stored at the start to reconstruct the physical parameter is thus considerably decreased, thereby decreasing the resources required to process the signal.

In other modes of implementation, the interferometric peaks are determined by calculating the envelope of the interferometric signal. Such a method is described in the publication by Usman Zabit et al.: "Self-mixing Laser Sensor for large displacements: signal recovery in the presence of speckle", IEEE Sensors Journal, Vol. 13, No. 2, February 2013.

The invention also relates to a method for determining a physical parameter, including a step of processing an interferometric signal SM(t) using the processing method defined above in at least one of its modes of implementation, said interferometric signal including information on the physical parameter to be determined, then a step of determining the physical parameter from the determined interferometric peaks of the interferometric signal SM(t).

Determining all of the interferometric peaks of the interferometric signal SM(t) using the processing method defined above in at least one of its modes of implementation advantageously allows the precision of the measurement of the sought physical parameter to be improved.

Advantageously, the method does not include a step of prior calibration of the laser light source, nor a step of calibration of the level of optical feedback C.

Thus, the elimination of any sort of calibration step makes implementation in real-time possible. Specifically, an error in a calibration step prevents deterministic or repeatable measurements being obtained with the device associated with the method.

In addition, carrying out a calibration step most often requires specialist techniques to be employed.

Since the method of the invention does not require a step of calibration of the laser light source and/or of the level of optical feedback, it thus makes it possible to make use of the method accessible to nonspecialist personnel, thereby making its use in an industrial setting realistic.

In one preferred exemplary implementation, the method allows the movement of the target to be reconstructed from the determined interferometric peaks of the interferometric signal SM(t).

The method advantageously allows the movement of an uncooperative target to be reconstructed, without addition of external components to the associated device.

Determining all of the interferometric peaks of the interferometric signal SM(t) using the processing method defined above in at least one of its modes of implementation advantageously allows the precision of the movement of the target to be improved.

PRESENTATION OF THE FIGURES

The following description, given merely by way of example, of one embodiment of the invention, is given with reference to the appended figures, in which:

FIG. 1 schematically illustrates an example device for measuring the movement of a target, said device being based on the self-mixing effect according to the invention;

FIGS. 3a to 3e illustrate an example of method steps for reconstructing the movement of a target from a signal modeled for a level of optical feedback equal to 0.5;

FIGS. 4a to 4e illustrate an example of method steps for reconstructing the movement of a target from a signal modeled for a level of optical feedback equal to 3;

FIGS. 8a to 8d illustrate the principle of reconstruction of the movement of the target for a first exemplary real signal strongly affected by speckle; and FIGS. 9a to 9d illustrate the principle of reconstruction of the movement of the target for a second exemplary real signal strongly affected by speckle.

DETAILED DESCRIPTION OF THE INVENTION

The exemplary embodiment of the measuring device is described in detail for its application to the case of a measurement of the movement of a target. This choice is nonlimiting and the invention is also applicable to other measurements of physical parameters of a target, such as for example the measurement of its speed or even its vibrations or its absolute distance.

Figure 1:
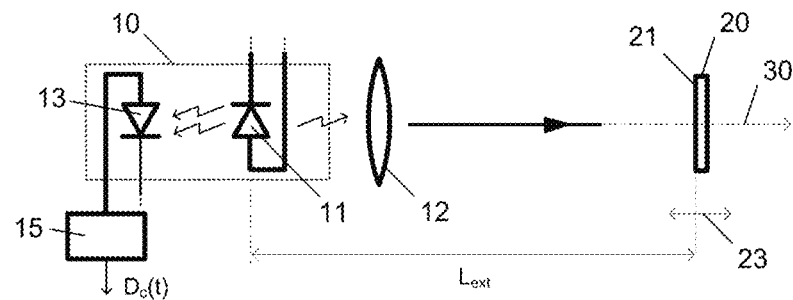

FIG. 1 schematically illustrates an optical device 10 for measuring the movement of a target 20 according to one particular embodiment of the invention and based on the self-mixing effect described above.

The optical device 10 includes a laser light source 11, a lens 12, a detector 13 and means 15 for converting an interferometric signal obtained as output from the detector 13.

The laser light source 11, the lens 12 and the target 20 are placed on a common optical axis 30.

The laser light source 11 is sensitive to the level of optical feedback. It includes an optical cavity (not shown) and is suitable for emitting a measuring optical beam, of wavelength λ, along the optical axis 30 in the direction of the target 20 and for receiving the measuring beam reflected by said target.

Preferably, the laser light source 11 is a laser diode, but the use of any other type of laser light source, such as a gas laser, is possible.

In one preferred embodiment, the laser diode 11 is supplied with a current having a value that is substantially continuous over time.

In another embodiment, the laser diode 11 is supplied with a current that varies over time, such as a periodic current, for example of the sinusoidal or triangular type.

In contrast to conventional interferometers, it is not obligatory to stabilize the wavelength of the laser diode by means of feedback systems that increase cost, the precision achievable without feedback being sufficient for many applications requiring a low-cost device.

The laser diode 11 is placed at a distance $L_{ext}$ from the target.

The lens 12 is placed on an optical path traced by the optical measuring beam, said lens 12 furthermore being interposed between the laser diode 11 and the target 20.

Preferably, the lens 12 is used when measuring the movement of targets located at distances $L_{ext}$ larger than a few centimeters, it is not generally necessary for distances $L_{ext}$ smaller than a few centimeters.

The lens 12 is chosen, on the one hand, so as to receive a measuring beam issued from the laser diode 11 and to collimate/focus said measuring beam in the direction of the target, and on the other hand, to receive a fraction of the measuring beam reflected by the target and to collimate/focus it toward the internal cavity of the laser diode 11.

The target 20 is in movement, as indicated schematically by way of example by the arrow 23, along the optical axis 30.

The optical measuring device 10 according to the invention is therefore suitable for measuring the projection of the movement of the target 20 along the direction of the optical axis 30.

The target 20 is suitable for receiving at least some of the measuring beam issued from the laser diode and has a surface 21 able to reflect all or some of said measuring beam.

Preferably, the surface 21 of the target 20 is substantially perpendicular to the optical axis 30 in order to obtain the best possible precision. However, a perpendicularity relative to the optical axis is not essential to obtain a measurement of the movement of the target according to the invention.

In the case of non-perpendicularity of the movement, the movement of the target will be measured along the projection along the optical axis 30.

In one exemplary embodiment, the target 20 may be a portion of an object for which the movement must be measured.

Alternatively, the target 20 may be separate from the object but attached to the object, so that measuring the movement of the target is equivalent to measuring the movement of the object.

The surface 21 of the target 20 may be substantially planar or have a rough surface finish.

The non-collimated measuring beam issued from the laser diode 11 propagates toward the lens 12 that collimates/focuses it toward the target 20. The target 20 reflects a fraction thereof.

The reflected measuring beam, after passage through the lens 12, is reinjected into the optical cavity of the laser diode 11 creating interference with the measuring beam emitted by the laser diode.

When the target 20 is in movement along the optical axis 30, the optical path length traced by the beam(s), i.e. the round-trip distance between the laser diode 11 and the target 20, varies, and the interference, which is dependent on the movement of the target, generates a variation in the optical power of the measuring beam emitted by the laser diode 11.

The measuring detector 13 detects the variation in the optical power of the measuring beam emitted by the laser diode and converts it into a signal, called the interferometric signal SM(t), including the interference, which interference is dependent on the movement of the target over time. This interferometric signal SM(t) may for example be a current signal, a voltage signal, a power signal or even a digital signal.

The measuring detector is preferably a photodiode 13. In one preferred exemplary embodiment, the photodiode 13 is a photodiode that is integrated into the same package as the laser diode 11 and located on a back side of said laser diode. This photodiode, which is conventionally used in a feedback loop to control the emission power of the laser diode, is employed to detect variations in the optical power of the laser diode, which variations are induced by the self-mixing effect.

Once output from said photodiode, the converting means 15 process the interferometric signal SM(t) issued from the photodiode 13 and convert it into a measurement of movement $D_c(t)$ of the target.

FIGS. 3a, 4a, 5a, and 6a show four typical interferometric-signal waveforms obtained for four types of target.

Figure 5:
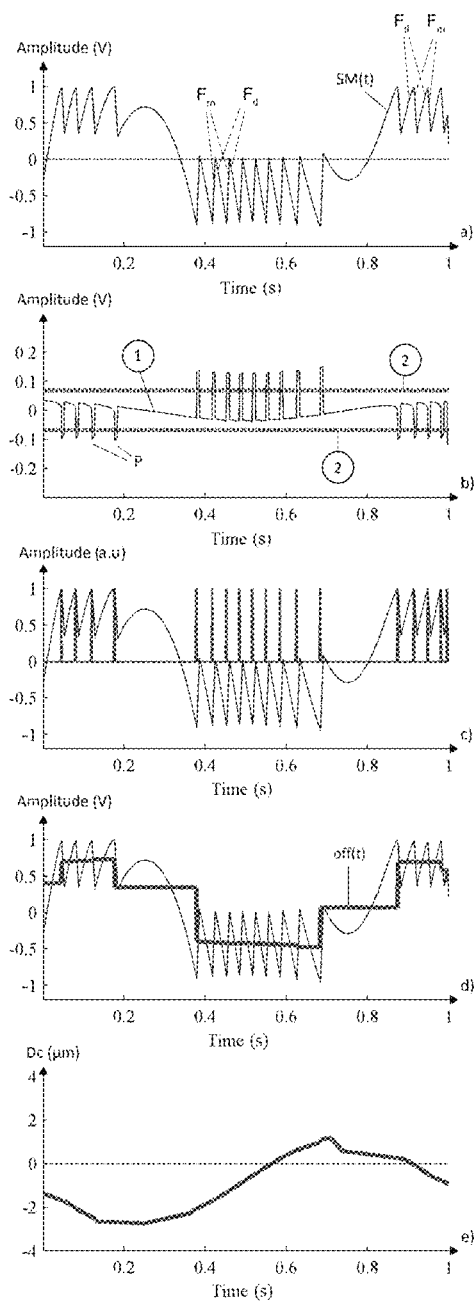
FIGS. 5a to 5e illustrate an example of method steps for reconstructing the movement of a target from a signal modeled for a level of optical feedback equal to 5.

FIG. 3a, FIGS. 4a and 5a, respectively, illustrate an interferometric signal SM(t) as a function of time, for a level of optical feedback C of 0.5, 3 and 5, respectively.

The interferometric signals are represented by non-sinusoidal interferometric fringes having a specific asymmetric sawtooth shape that is more or less pronounced depending on the value of the parameter C. The interferometric signal SM(t) has an almost sinusoidal waveform for a low C, for example lower than 0.5. It exhibits a sawtooth waveform that is more and more pronounced, then with a hysteresis effect, as the parameter C increases.

Each interferometric fringe has a rising front $F_m$ and a descending front $F_d$. The rising front $F_m$ of an interference fringe is defined, relative to a descending front, as the front having the highest degree of inclination, and a descending front $F_d$ is defined as the front having the lowest degree of inclination. FIGS. 3a, 4a and 5a clearly illustrate the rising and descending fronts of the interferometric fringes, depending on the value of the parameter C.

Figure 6:
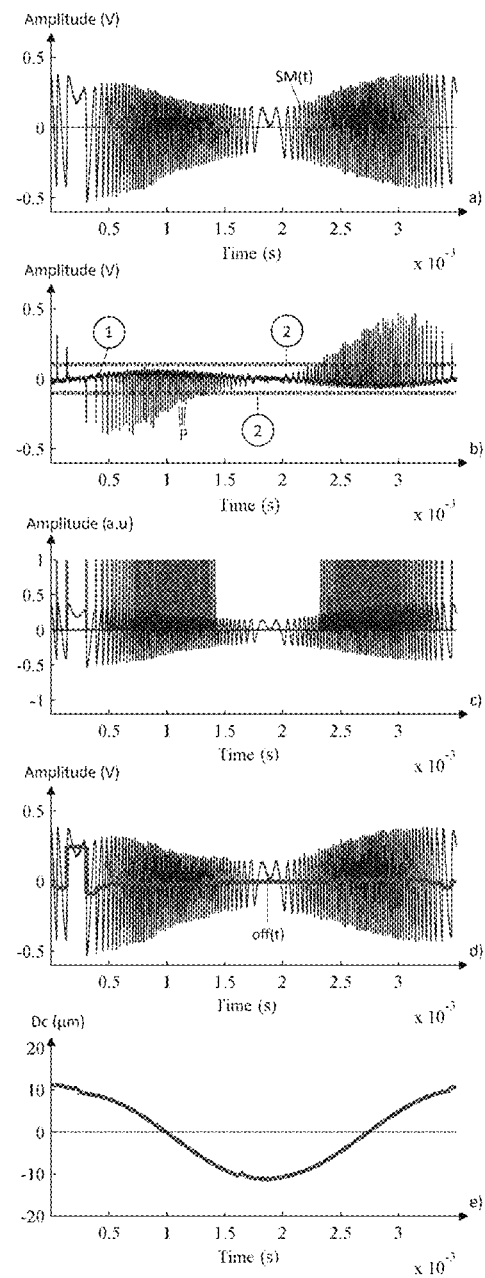
FIGS. 6a to 6e illustrate an example of method steps for reconstructing the movement of a target from a real signal weakly affected by speckle.

FIG. 6a illustrates an interferometric signal affected by speckle.

Figure 2:
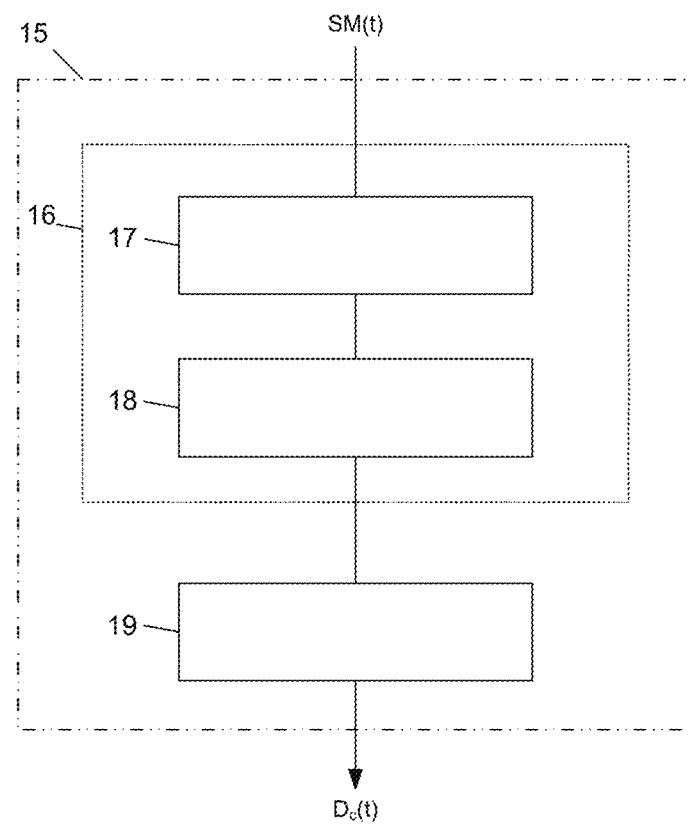
FIG. 2 illustrates a schematic chart of the method for reconstructing the movement of a target according to the invention.

The converting means 15, detailed in FIG. 2, include:
means 16 for processing the interferometric signal SM(t) in order to determine therefrom interferometric peaks; and
means 19 for reconstructing the movement $D_c(t)$ of the target 20 from the interferometric peaks obtained as output from the processing means 16.

These converting means 15 may be analogue and/or digital means.

The processing means 16 include:
first means 17 for removing a continuous component Off(t) from the interferometric signal SM(t); and
second means 18 for determining interferometric peaks from the signal obtained as output from the first means 17.

In one preferred embodiment of the first means 17, said first means are configured to remove the continuous component locally for each of the interference fringes of the interferometric signal SM(t).

In other words, the continuous component Off(t) of the signal is decomposed into a vector of N local continuous components.

N is the number of determined interference fringes of the interference signal SM(t).

Each local continuous component is associated with an interference fringe of the interference signal SM(t).

A local continuous component of the associated interference fringe is measured level therewith.

The continuous component Off(t) of the interferometric signal SM(t) is then subtracted from the interferometric signal SM(t).

Removal of this continuous component advantageously makes it possible to eliminate hysteresis effects that appear in the interferometric signal when the level of optical feedback C from the target is high, for example when C>4.7, such as for example the signal illustrated in FIG. 5a.

This removal of this continuous component also makes it possible to eliminate fading effects associated with speckle, such as for the signal illustrated in FIG. 9a.

The elimination of hysteresis and fading effects from the interferometric signal SM(t) advantageously makes it possible to use only one signal processing algorithm, whatever the distance and surface finish of the target the movement of which it is being sought to measure.

In one preferred embodiment of the second means 18, said second means 18 include:
a Hilbert filter for determining phase and quadrature components of the interferometric signal SM(t) from the signal obtained as output from the first means 17; the signal obtained has an analytical form;
a calculating means for calculating the phase of the interferometric signal from these components; the phase obtained is modulo $2\pi$; and
a means for obtaining interferometric peaks from the phase of the interferometric signal.

Using a Hilbert filter advantageously allows all of the interferometric peaks to be obtained, whatever the roughness of the target and whatever the form of the interferometric signal (fading effect, hysteresis effect, etc.).

Using the Hilbert filter in association with an interferometric signal generated via the self-mixing effect allows the influence of fading of the interferometric signal, which is related to target roughness, to be removed.

Therefore, determining all of the interferometric peaks of the interferometric signal leads to an improvement in the precision of the measurement of the movement of the target.

The advantage of such a Hilbert filter also resides in the fact that it may be implemented by means of hardware, via an analogue filter, or software, via a digital filter, depending on the requirements.

In one exemplary reconstructing means 19, said converting means use a phase unwrapping method to reconstruct the movement of the target.

This method is a method known as such and will therefore not be described.

These reconstructing means 19 may be analog and/or digital means depending on the type of interferometric signal SM(t).

The calculating means 15 described above of the measuring device have the advantage of not requiring means for calibrating the laser diode, via evaluation of its linewidth enhancement factor $\alpha$, and/or the parameter C.

By way of representative illustration of the invention, FIGS. 3a-d, 4a-d, 5a-d and 6a-d illustrate an example of steps allowing the continuous component to be removed from the interferometric signal, said steps being carried out via the first means 17. For FIGS. 3a-d, a theoretical interferometric signal was simulated with a level of optical feedback C of 0.5.

The three interferometric signals (FIGS. 3a-d, 4a-d and 5a-d) were produced using the software package Matlab®. The interferometric signals were created using a behavioral model of the interferometric signals generated by the self-mixing effect described in the publication by Plantier et al.: "Behavioral model of a self-mixing laser diode Sensor" IEEE Journal of Quantum Electronics, Vol. 41, No. 9, September 2005.

The three simulated interferometric signals corresponded to a movement of the target equivalent to five times the wavelength value of the simulated laser diode. The laser-target distance was not directly introduced, but the variation in the level of optical feedback C respected this relationship because it is dependent on the type of surface and the laser-target distance.

FIGS. 3a, 4a, 5a and 6a illustrate, as described above, the interferometric signal SM(t) obtained as output from the photodiode 13.

In a first step, the interferometric signal SM(t) is filtered, for example via a high-pass filter, which is the equivalent of a differentiator. The filtered signal $SM_f(t)$ is represented in FIGS. 3b, 4b, 5b and 6b by the curve 1. The signal $SM_f(t)$ contains interferometric peaks P. In the example in FIGS. 3b and 4b, the interferometric peaks P are 18 in number. In the example in FIG. 5b, the interferometric peaks are 17 in number.

In a subsequent step, a positive threshold and a negative threshold are established. The thresholds are automatically calculated to the size of the received sampling window. The two thresholds are also represented in FIGS. 3b, 4b, 5b and 6b by the two curves 2.

Triggering times at which the interferometric peaks P appear beyond one of the two thresholds are then detected. The FIGS. 3c, 4c, 5c and 6c illustrate these triggering times. The interferometric signal SM(t) is also shown in these figures.

The interferometric signal SM(t) comprised between two successive triggering times represents a pseudo-fringe of said interferometric signal SM(t).

It will be observed that a pseudo-fringe generally corresponds to an interference fringe of the interferometric signal SM(t), as is illustrated in FIGS. 3c, 4c, 5c and 6c.

In certain cases, depending on the defined value of the thresholds, certain interferometric peaks are not detected. A pseudo-fringe then corresponds to a plurality of successive interference fringes, as illustrated in FIG. 6c.

Interferometric peaks P exceeding one of the two thresholds trigger mean filtering of the interferometric signal SM(t). Local means, or local continuous components, of the interferometric signal SM(t) between two triggering times, corresponding to each determined pseudo-fringe, are determined by this mean filter, as illustrated in FIGS. 3d, 4d, 5d and 6d. The interferometric signal SM(t) is also shown in these figures.

All the local continuous components, referred to as the continuous component Off(t), are then subtracted from the interferometric signal SM(t).

The interferometric signal obtained is what is referred to as a corrected interferometric signal $SM_c(t)$.

The interferometric signal SM(t) is thus offset locally about zero.

Removing each local continuous component associated with each pseudo-fringe thus guarantees that there are no restrictions on the use of the Hilbert transform, which we will describe below.

The non-intrusive effect of the processing on modeled interferometric signals that are not subject to hysteresis effects or other effects such as fading that affect the signal may thus easily be seen in the various figures.

All the steps described above are carried out via the first means 17.

In a subsequent step, carried out via the second means 18, the analytic form of the interferometric signal SM(t) is determined via a Hilbert filter in order to calculate its phase modulo $2\pi$. The advantage of using a Hilbert filter is illustrated (FIGS. 7a to 7d) in comparison with a conventional phase calculation method.

Figure 7A:
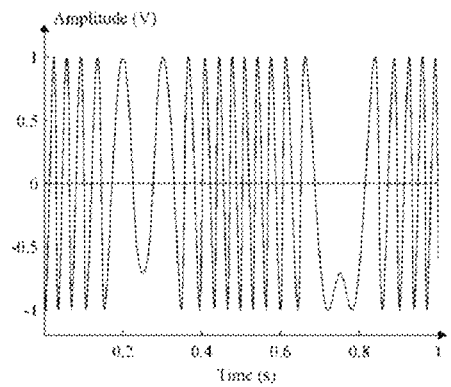
FIGS. 7a to 7d illustrate curves allowing the phase obtained with a conventional phase unwrapping method and the Hilbert method, for a signal modeled with a level of optical feedback equal to 0.5, and for a real signal strongly affected by speckle, to be compared.

By way of example, in FIG. 7a, an interferometric signal SM(t) has been simulated with a level of optical feedback C equal to 0.5.

The calculation of the associated phase was carried out in two ways:
using a conventional "arccos" function of type known per se; and
using an analytic function (Hilbert transform).

Figure 7B:
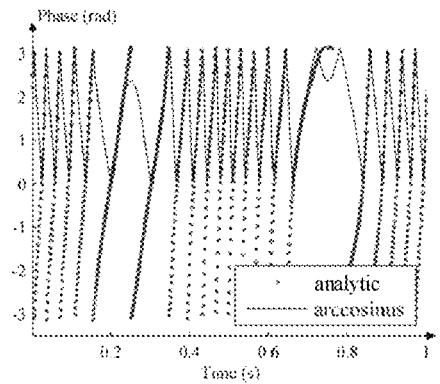

The constant amplitude signal, obtained using the conventional function, is located in the interval $[0; \pi]$, as illustrated in FIG. 7b by the solid curve "arccosinus".

The constant amplitude signal, obtained using the analytic function, is located in the interval $[-\pi; \pi]$, as illustrated in FIG. 7b by the dotted curve "analytic".

It may be seen that, for both amplitude signals, the interference fringes may easily be distinguished via a single threshold, of value $\pi$.

Figure 7C:
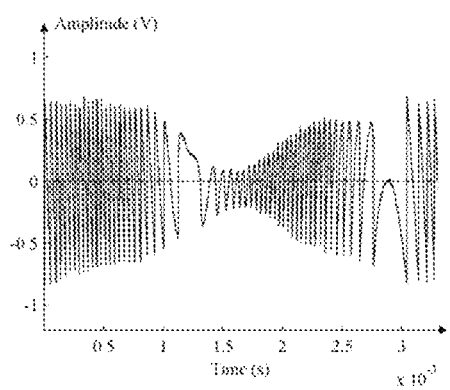

In FIG. 7c, the amplitude of the simulated interferometric signal SM(t) shown has been randomly attenuated.

Figure 7D:
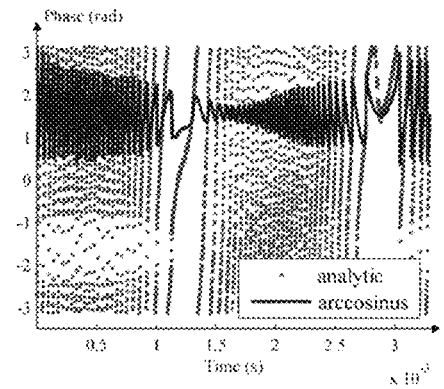

The constant amplitude signal, obtained using the conventional function, is located in the interval $[0; \pi]$, as illustrated in FIG. 7d by the solid curve "arccosinus".

The signal of constant amplitude, obtained using the analytic function, is located in the interval $[-\pi; \pi]$, as illustrated in FIG. 7d by the dotted curve "analytic".

It may be seen that if the threshold value is set to n the conventional function is not able to distinguish the interference fringes.

In contrast, the analytic function is still able to distinguish the interference fringes with the single threshold of value $\pi$. Use of the Hilbert transform has no need to follow the envelope, nor the waveform of the signal to calculate the phase of the interferometric signal.

Once the phase of the interferometric signal SM(t) has been determined, all of the interferometric peaks are determined.

In a last step, the direction and amplitude of the movement of the target 20 are determined using all the interferometric peaks.

This step is known as such and will not be described here.

By way of indication, the orientation of the sawteeth of the interferometric fringes gives the direction of movement of the target. When the sawtooth changes inclination, the target has changed movement direction.

FIGS. 3e, 4e, 5e and 6e illustrate the reconstructed movement Dc(t) of the target obtained from the corrected signal $SM_c(t)$ and after passage through the Hilbert filter.

It is interesting to note that the first means 17 are not intended to determine all the interferometric peaks P required to reconstruct the movement of the target. The purpose of the first means 17 is to carry out pre-filtering in order to set the interferometric signal to substantially about zero. It is the second means 18 that allow all of the interferometric peaks to be determined in order to deduce therefrom the phase of the interferometric signal SM(t), comprised between $-\pi$ and $\pi$, using the Hilbert filter.

In order to illustrate the precision obtained for the target movement reconstructed using the measuring device according to the invention, many experiments were carried out and are summarized below in the form of two examples.

In all the experiments:
the laser light source was a Hitachi® HL 7851G LD laser diode emitting at a wavelength $\lambda$ of 785 nm with integrated photodiode. The laser diode was supplied with a constant injection current of 70 mA, and had a maximum output power of 20 mW. The beam emitted was collimated through a 5 mm focal lens and was focused on a target of 80 mm diameter;
the target was positioned at a distance of 45 cm from the laser diode, and the movement of the latter was generated by a Tektronix® AFG3022 function generator. The target was vibrated sinusoidally at a frequency of 300 Hz with a peak to peak amplitude of 10 V. The target moved along the axis 30.

The interferometric signals were observed and recorded by a transimpedance amplifier and a LeCroy® HRO 66Zi oscilloscope.

The interferometric signals were processed in order to reconstruct the movement D(t) of the target.

Two experiments will now be presented. The results obtained are illustrated in FIGS. 8a-d and 9a-d, respectively.

EXAMPLE 1 the target 20 was covered with P40 sandpaper having an average roughness of 425 μm.

The results obtained are shown in FIGS. 8a to 8d.

FIG. 8a illustrates the interferometric signal SM(t) measured by the photodiode. It may be seen that the amplitude of the signal is degraded, due to the speckle effect.

FIG. 8b illustrates the filtered interferometric signal $SM_f$.

FIG. 8c illustrates the interferometric signal SM(t) and the calculated continuous component Off(t) (all the local components measured per fringe).

FIG. 8d illustrates the reconstructed movement $D_c(t)$.

This first example clearly illustrates the fact that the measuring device according to the invention allows the actual movement of a rough target to be reconstructed.

EXAMPLE 2 the target was covered with a phosphorescent material active in the infrared and exhibiting slow fading, namely the material VRC2 from Thorlabs®.

The results obtained are shown in FIGS. 9a to 9d.

FIG. 9a illustrates the interferometric signal SM(t) measured by the photodiode. It may be seen that the amplitude of the signal is clearly more degraded by speckle than for FIG. 8a. It may also be seen that the interferometric signal SM(t) is lost at the times t =0.5 ms and t=2.7 ms.

FIG. 9b illustrates the filtered interferometric signal $SM_f$.

FIG. 9c illustrates the interferometric signal SM(t) and the calculated continuous component Off(t).

FIG. 9d illustrates the reconstructed movement $D_c(t)$.

This second example perfectly illustrates the fact that the measuring device according to the invention allows the actual movement of a target to be reconstructed even in the presence of a temporary loss of information.

These examples clearly confirm the robustness of the measuring device and the associated signal processing for various target surface finishes.

The measuring device according to the invention and the processing of the associated signal advantageously allow the uncertainty in the measurement of the movement of the target caused by peak counting errors to be decreased. It allows, via suitable real-time signal processing, any interferometric signal waveform, function of the surface finish of the target, to be processed without constraint on the waveform of the interferometric signal.

The measuring device according to the invention is a device that is simple to produce, not very bulky (no external optical, mechanical or electronic components supplementary to the base configuration), self-aligning and provides a robust way of measuring movement whatever the surface finish of the target used and its distance relative to the laser source. It also has the advantage of having an affordable cost and of being applicable to an industrial setting.

The invention claimed is:

1. An optical device, based on the self-mixing effect, for determining a physical parameter, including:
    a laser light source for generating a light beam, called the emitted beam, in the direction of a target;
    a means for detecting an interferometric signal SM(t), said interferometric signal including interference fringes and information on the physical parameter to be determined, and being generated by interference between the emitted beam and a light beam reflected by the target; and
    means for converting the interferometric signal SM(t) obtained by the detecting means into a measurement of the physical parameter;
    wherein said converting means include:
    first means for removing a continuous component Off(t) from the interferometric signal SM(t), said first means being configured to remove the continuous component locally for each of the interference fringes of the interferometric signal; and
    second means for determining interferometric peaks of the interferometric signal SM(t), said peaks being obtained from the signal obtained as output from the first means, the second means including a Hilbert filter.

2. The optical device as claimed in claim 1, not including means for calibrating the laser light source.

3. A method for processing an interferometric signal SM(t) obtained by self-mixing, via an optical device according to claim 1, said interferometric signal including interference fringes, wherein the method includes, in succession, the steps of:
    removing a continuous component Off(t) from the interferometric signal SM(t), in order to obtain a corrected signal $SM_c(t)$, using the first means, said continuous component Off(t) of the interferometric signal being removed locally, for each detected interference fringe of the interferometric signal SM(t); and
    determining interferometric peaks of said interferometric signal SM(t) from the corrected signal $SM_c(t)$ using the second means, said interferometric peaks being determined by applying a Hilbert filter to the corrected signal $SM_c(t)$.

4. A method for determining a physical parameter, including a step of processing an interferometric signal SM(t) using the method as claimed in claim 3, said interferometric signal including information on the physical parameter to be determined, then a step of determining the physical parameter from the determined interferometric peaks of the interferometric signal SM(t).

5. The method as claimed in claim 4, including a prior step of acquiring the interferometric signal SM(t) carried out using the optical device.

6. The method as claimed in claim 5, not including a step of calibration of the laser light source.

7. A method for determining a movement of a target, including a step of processing an interferometric signal SM(t) using the method as claimed in claim 3, said interferometric signal including information on the physical parameter to be determined, then a step of reconstructing the movement of the target from the determined interferometric peaks of the interferometric signal SM(t).

* * * * *